United States Patent
Wheeler

[11] 3,829,192
[45] Aug. 13, 1974

[54] RECEIVE AND DISPLAY OPTICAL RASTER SCAN GENERATOR

[75] Inventor: Bryce A. Wheeler, Los Angeles, Calif.

[73] Assignee: Hughes Aircraft Company, Culver City, Calif.

[22] Filed: May 21, 1973

[21] Appl. No.: 362,593

Related U.S. Application Data

[63] Continuation-in-part of Ser. No. 152,466, May 28, 1971, Pat. No. 3,764,192.

[52] U.S. Cl. .................. 350/7, 178/7.6, 350/285
[51] Int. Cl. ............................................ G02b 17/00
[58] Field of Search ............ 350/6, 7, 285; 178/7.6; 250/234, 235, 236, 347

[56] References Cited
UNITED STATES PATENTS
3,764,192  10/1973  Wheeler..................... 350/7

OTHER PUBLICATIONS
R. E. Tibbetts. "Simplified Optical Unit for a Page Scanner," IBM Technical Disclosure Bulletin, Vol. 8, No. 6, November 1965.

Primary Examiner—Ronald L. Wibert
Assistant Examiner—Richard A. Rosenberger
Attorney, Agent, or Firm—W. H. MacAllister; Donald C. Keaveney

[57] ABSTRACT

There is disclosed an optical scanning device optically free of both astigmatic distortion and image rotation which is thus suitable for use with an afocal magnifying system. The device detects infrared energy from a scene, converts the received signals into visible light output, and displays the scene to an observer through a unitary dual function scanning device, one of its functions being the conversion of infrared energy received in an azimuth-elevation scan pattern to electrical signals and the other function being the synchronous generation of a visible scene from said signals. The geometry of the device is such that both the elevation and azimuth scan in both modes appear to originate from a substantially fixed area thereby precluding astigmatic distortion when said scan is optically coupled to an afocal magnifying system.

9 Claims, 18 Drawing Figures

$\delta = \dfrac{360°}{\text{No. of Facets}}$

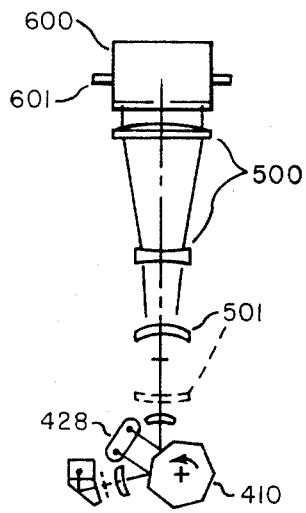
Fig. 12.
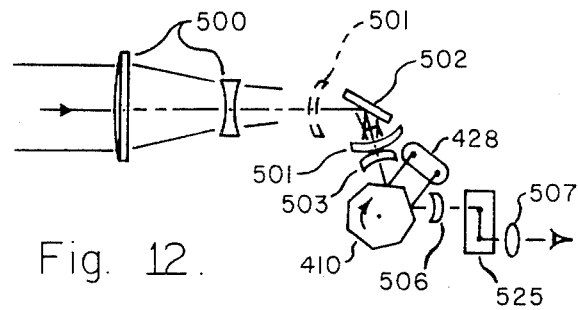
Fig. 12a.
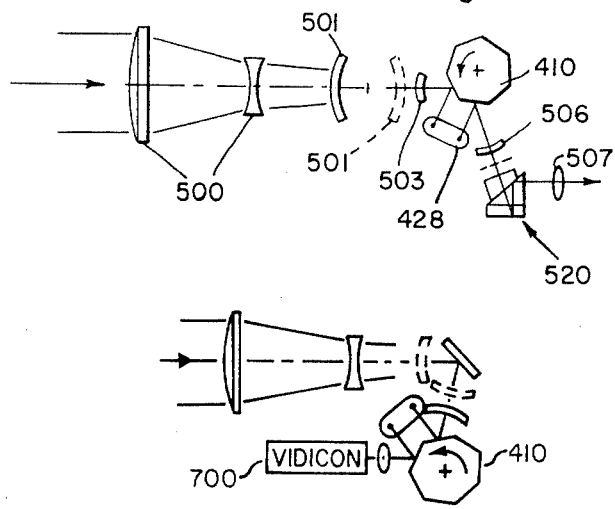
Fig. 13
Fig. 14
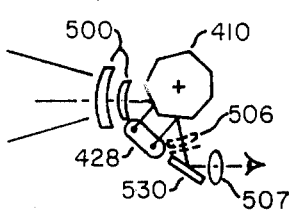
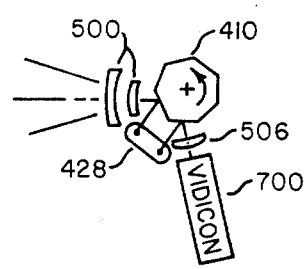
Fig. 15
Fig. 16

3,829,192

RECEIVE AND DISPLAY OPTICAL RASTER SCAN GENERATOR

REFERENCE TO RELATED APPLICATIONS

This application is a continuation-in-part of my co-pending patent application Ser. No. 152,466 filed May 28, 1971, and entitled "Optical Raster Scan Generator" which is assigned to the Hughes Aircraft Company, the assignee of this invention and which was issued as U.S. Pat. No. 3,764,192 on Oct. 9, 1973.

BACKGROUND OF THE INVENTION

The apparatus of this invention is adapted to scan and/or project substantially collimated radiation such as light of either infrared or visible wavelength in a continuous raster pattern in such a manner as to permit the use of the apparatus in systems using fixed position parallel channel detector arrays and having a focal magnification such as is encountered in a telescope of either fixed or variable field of view without introducing image rotation or astigmatic distortion into said system by virtue of the scan pattern.

This invention is directed to the scan generating optical-mechanical portions of the apparatus for synchronous receiving and display. One exemplary type of electronics for such parallel channel readout arrays which may be used with the scan generator is described and claimed in U.S. Pat. No. 3,723,642 filed May 28, 1971, on behalf of Peter Laakmann, issued Mar. 27, 1973 and entitled "Thermal Imaging System" which is assigned to Hughes Aircraft Company, the assignee of this invention. My above noted copending application Ser. No. 152,466 discloses and claims a single function or read only version of the raster scan generator described herein, which is also suitable for use with the electronic circuitry of U.S. Pat. No. 3,723,642.

PRIOR ART

There have, of course, been many different types of scan generators for receiving and projecting radiation. One arrangement for deflecting the output of a laser to be projected as a flying spot scanner in a display mode is disclosed by U.S. Pat. No. 3,436,546 to Derderian et al. This system deflects the laser beam first from an oscillating mirror from whence it is transmitted to a faceted rotating mirror drum for deflection in a second coordinate and from which it is projected through a projection lens and onto a screen. A similar system for T.V. projection is shown Clothier et al. U.S. Pat. No. 2,163,537. An infrared scanning system is shown in Passaro 3,597,617.

It should be noted that there is no intention in any of these arrangements of using the device with an afocal magnifying system such as a telescope, and it is not essential to the device that the scan appear to originate in both azimuth and elevation from a substantially common point on a mirror surface. In fact, the geometry of all of these systems is such that it will not so originate and the fact that the apparent point of origin will wander back and forth across the face of the facet of the mirror drum renders each of the systems unsuitable for use with surveillance telescopes or the like.

A more recent scan generator which does provide a system whose point of scan origin in both azimuth and elevation does in fact originate from a common point and hence which can be used with telescopic systems without introducing astigmatism is disclosed in U.S. Pat. No. 3,626,091 to Robert P. Casper which is also assigned to Hughes Aircraft Company. In the Casper system, for both receiving and display, the azimuth scan is generated by a rotating faceted mirror wheel shown to have 12 sides and each side provides a continuous azimuth scan. Casper obtains his elevation scan, not from the use of a second oscillating mirror as disclosed herein, but by giving each of the 12 mirror facets of his rotating azimuth wheel a different angular deviation from the vertical. Each face will position the beam at a different elevational angle during succession azimuth scans. This system thus provides a continuously variable azimuth line scan, but a discrete or digitally indexed elevation scan. That is to say, each horizontal line in the raster is absolutely horizontal and the next line down is displaced from it by an amount determined by the angular deviation of its mirror facet from the vertical. Such a system is excellent for its intended application which contemplates a single detector precisely aligned with each vertical angular deviation so that only one detector reads each elevation position, but since the sloping mirror faces produced image rotation, such a system cannot provide the enhanced signal-to-noise ratio and increased reliability resulting from the redundancy which is available in a system using parallel channel connected detector arrays all of which read every azimuth line scan. Furthermore, the resolution attainable in elevation is limited by the number of mirror faces used, and it is also necessary to obtain the display scan from the back side of the same mirror, the front side of which is used for the receiving scan. For a parallel channel system of convenient configuration a scan generator of the type disclosed herein which is continuous in its deflection in both azimuth and elevation is necessary. The Casper scan generator cannot be used with such detector arrays since although it does not produce astigmatism, it does produce image rotation proportional to the angular deviation of the mirror faces from their spin axis. The necessary condition for avoiding image rotation is that all mirror faces of the rotating azimuth scan generation wheel must be parallel to the spin axis. This in turn requires the use of a second scanning mirror which results in introducing astigmatism prior to the invention of my copending application. The present invention relates to the extension of that single mode scan system to a synchronized dual mode system for both receiving and displaying an image in a parallel channel detector system.

SUMMARY OF THE INVENTION

In the description of the present invention, the scanning of a raster line horizontally is described as an azimuth scan and the vertical indexing scan from raster line to raster line is described as an elevation scan. It will, of course, be understood that these are relative terms used merely to denote two orthogonal axes which are at right angle relative to each other and that no connotation of the absolute orientation of the system is intended.

To produce a nonastigmatic and nonimage rotating raster scan for either reception or display which is continuously deflected in both azimuth and elevation and which appears to originate from substantially a single point by optical-mechanical means, it is desirable that two mirrors rotating or oscillating about mutually perpendicular axes be placed within the optical system and that one mirror be tiltable about one axis to generate the rasterlines in one angular direction and a similar mirror be tiltable about the other axis for generating continuous indexing of the raster lines in the other angular direction.

One might place within an optical beam two spinning mirror blocks having mirror faces thereon and rotating about two mutually perpendicular axes deviating the beam through a raster format. Obviously, however, two spinning mirror blocks cannot occupy the same space at the same time and, hence, require separation in order to generate two orthogonal fan scans. The substantial separation between the actual origin of the two generated fans has heretofore prevented such a scanner from being used in conjunction with orthogonally symmetrical optics. In the Casper system the two fans do, in fact, originate from the same point but at a price of producing image rotation and of having one of the fans discretely or digitally indexed rather than continuously indexed. No practical mechanism for achieving a dual mirror scan which appears to originate substantially from one point had been achieved prior to my above copending application Ser. No. 152,466. Prior art devices such as Derderian's and other devices using a spinning multi-faceted mirror block and a second separate oscillating mirror with the point of scan origin generated by the oscillating mirror being projected through optical relay elements to a point in the path of rotation of the spinning block have suffered from wandering of the point, or apparent point, of origin of the combined scans which preclude their use with afocal magnifying systems and with parallel channel detector arrays.

The dual optical path apparatus contemplated by this invention has a first multifaceted mirror structure spinning about the azimuth axis (which is here shown to lie in the vertical direction) adjacent facets of which are respectively included in each path with the mirror surfaces sequentially reflecting radiation. The size, shape and geometrical location of the beam reflected from the mirror surfaces in the receiving path is defined by the aperture and field stops of the objective lens system which typically includes telescopic magnification. The nominal point of rotation of the fixed beam generated by the rotating mirror structure is called for description purposes "the pupil" and, as may be seen in FIG. 1 wherein the circle P is shown as the pupil, is located normal to the midfield optical center line and is centered on each of the reflecting mirror surfaces of the multifaceted mirror structure when that surface is normal to the midfield optical center line. This is the point or fixed area from which both azimuth and elevation scans appear to originate in both the receiving or transmitting display mode of operation and/or optical path of the device. When they have the proper relationship to each other, each of the adjacently positioned scan generating optical paths has such a point as will be seen below. The beam reflected off the multifaceted mirror in the receiving path strikes a nodding mirror before entering the detector lens by which it is focused onto a radiation sensor, or sensor array. The nodding mirror oscillates through an angle about an axis parallel to a plane which is perpendicular to the axis of rotation of the multifaceted mirror and which is on a critical locus of centers and generates a continuous angular deflection in elevation. The position of the axis of rotation of the nodding mirror is critical in locating the pupil P to contain the apparent substantially fixed point of origin of scan of the beams in elevation and azimuth. The nodding mirror axis position will be further described below.

The optical path described above serves to receive infrared energy from a scene and to convert the received signals to electrical signals. In the dual mode system these electrical signals are applied to a light generating display which may be formed from light emitting diodes or other suitable devices. The output of this display is then transmitted through the second or transmitting optical path which is adjacent to and symmetrical with the receiving path in order to provide for the synchronous and symmetrical generation of a visible scene from the electrical signals. That is to say, the light output from the display is directed onto an adjacent portion of the same nodding mirror and from there onto an adjacent facet of the same rotating mirror which was also used to generate the receiver scan. The output from the rotating mirror may be viewed directly by an eyepiece or applied to suitable visual display means. By virtue of the geometry of the currently disclosed scan generator, this display may also include suitable magnification.

It is therefore an object of this invention to provide apparatus for scanning a received field of radiation at a first wavelength in a raster pattern.

It is another object of this invention to provide apparatus which will both scan a field of radiation and project a second field of radiation at a wavelength different from the wavelength of the first field of radiation in synchronous relationship therewith.

It is a more specific object of this invention to provide such apparatus which is suitable for use with afocal magnifying systems and with parallel channel detector arrays by virtue of having scan patterns which are continuous in deflection in both azimuth and elevation and which both appear to originate from a common virtual pupil.

BRIEF DESCRIPTION OF THE DRAWINGS

Other objects and advantages will become apparent from the following description taken in connection with the accompanying drawings wherein like reference characters are used to refer to like parts throughout and in which

FIG. 1 is a perspective schematic view of the working parts of a typical apparatus in accordance with a single channel embodiment of this invention disclosed in my earlier application;

FIG. 2 is a view, partly in section, of a modification of that embodiment of the invention;

FIG. 3 is a more detailed view, partly in section, of the apparatus of FIG. 1, the section having been taken looking from the rear of the device of FIG. 1;

FIG. 4 is a timing chart of a typical vertical scan sequence for the embodiment of FIG. 1 and 3;

FIG. 5 is a timing chart of a typical horizontal scan sequence for the embodiment of FIGS. 1 and 3;

FIG. 6 and 7 are ray diagrams used to explain the invention more specifically;

FIGS. 12, 12a, 13, 14, 15 and 16 are diagrammatic views of various types of equipment in which any of the dual channel apparatus of the invention may be used.

DETAILED DESCRIPTION OF THE INVENTION

Figure 1:
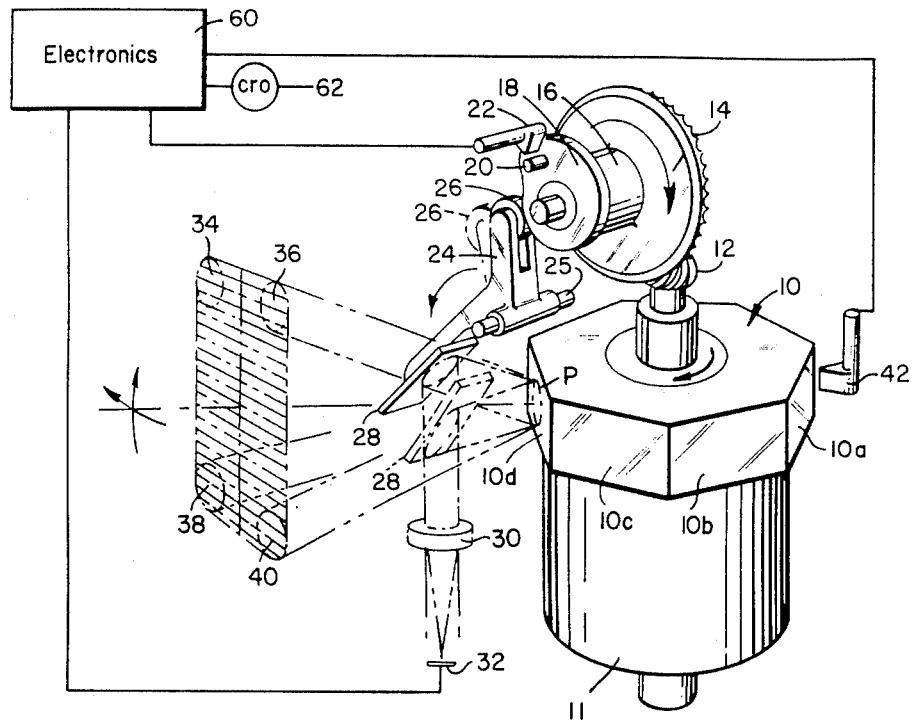
FIG. 1 through 7 are for convenience reproduced from my above noted application Ser. No. 152,466 since all of the features of that invention are used herein in combination with other apparatus additionally disclosed in FIGS. 8 through 17.

Because the single mode optical apparatus shown in my above noted copending application and in FIGS. 1 through 9 herein is bilateral, it may be described either as a radiation projector or as a radiation receptor. That is, it may be described as an apparatus which projects radiation such as light or infrared radiation in collimated beams which trace a raster scan, or it may be described as an apparatus which samples a radiation field of collimated light in a raster scan. For convenience and clarity, the apparatus will first be described as a single mode projector as in my copending application.

It is further to be stressed that the raster scan is described with the lines substantially horizontal and substantially uniformly spaced apart in a vertical direction. It is to be understood that the designations "horizontal" and "vertical" are for relative explanation purposes only and are not intended as absolute limitations. Further, the moving mirrors will be described as rotatable about azimuth and elevation axes. That, too, is for convenience only. In a typical operation of the invention, the so-called azimuth axis will actually be an azimuth axis and the so-called elevation axis will be an elevation axis. That is, the azimuth axis will be vertical and producing a horizontal sweep, and the elevation axis will be horizontal and producing a vertical sweep. However, the clear meaning of the description of the apparatus is not to be avoided by merely turning the apparatus onto its side.

Referring to FIGS. 1, 3, 6 and 7, a substantially point source of light or other radiation 32 is stopped by a stop 31 and collimated by a collimating lens 30. The collimated light is then reflected from mirror 28 onto the mirror surfaces of the spinning mirror structure 10. A motor 11 spins the mirror structure 10 at a high speed. The mirror structure 10 has a plurality of substantially flat mirror surfaces 10a, b, c, . . . uniformly distributed about the axis of spin 307 thereof and having their surfaces perpendicular to radial lines drawn from the axis of spin of structure 10. The spinning mirror structure 10 produces the line sweeps of the raster scan. A pinion gear, such as the hypoid gear 12, drives a corresponding spud gear 14. The axis of rotation of the spur gear 14 is parallel to a plane which is perpendicular to the axis of spin of the mirror structure 10. The shaft 16 of the gear 14 carries a cam 18 which is followed by a cam follower 26 adapted to rotate about a shaft 25 whose axis is also parallel to a plane which is perpendicular to the axis of rotation of the structure 10. The cam follower 24 has a follower wheel 26 which is adapted to ride upon the surface of the cam 18. On the other end of the cam follower 24 is positioned a mirror 28. The mirrors 10a, 10b, 10c, 10d . . . are called the azimuth scan mirrors. The mirror 28 is called the elevation scan mirror.

The cam 18 is a substantially linear cam. That is, it causes the cam follower 24 to rotate substantially linearly or proportional to the rotation of the cam until a return portion is reached. The linear portion of the cam 18 uses approximately 85 percent of the cam surface. The remaining 15 percent is used to return the cam follower to its starting position. The linearity of the cam may be adjusted, if desired, to compensate for slight variations in the line-to-line spacing of the raster scan. Such a raster scan is shown in the region of 34, 36, 38, and 40 of FIG. 1. Of course, it will be understood that any suitable means for driving the mirror 28 about oscillation axis 25 may be used to generate this raster so long as the geometry of the system to be described below is maintained.

Figure 6:
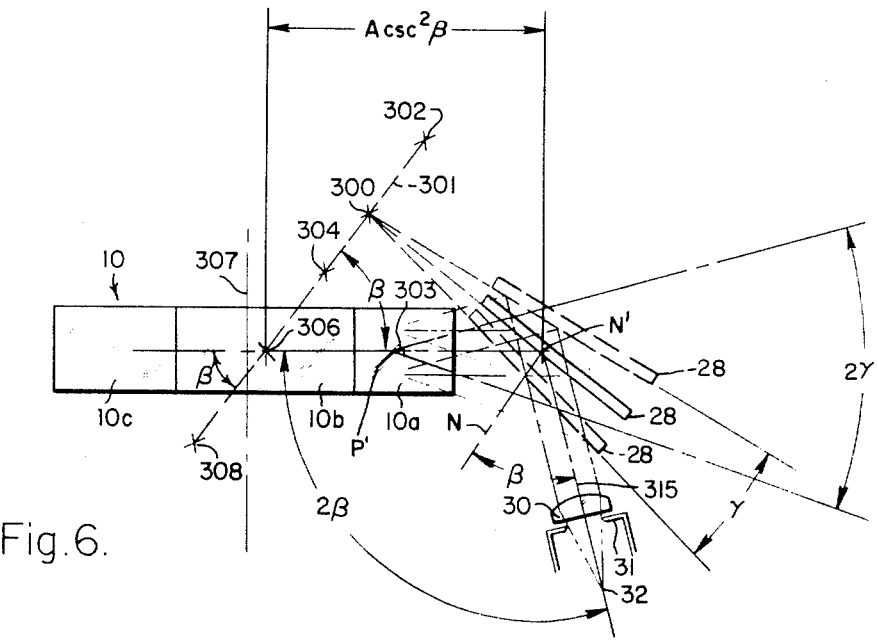

The geometry of the single mode optical system may be observed in FIGS. 6, 7, 8 and 9. A source of collimated light is produced, as shown in FIG. 6, from a point source 32 by a collimating lens 30. The collimated rays are produced in a pencil or bundle by the optical stop 31. The nodding mirror 28 is shown in its two extreme positions in dashed lines and in its substantially centered position by the solid line in FIG. 6. The centered position of the nodding mirror 28 is used for design purposes, whereby the design of the optical system is exactly correct with the mirror 28 in such substantially centered position, the design with the mirrors in their extreme positions deviating a minimal amount from exactly correct position so that distortion or nonlinearities in the sweep are within tolerances. It must be stressed that while the choice of the substantially centered position of the mirror 28 is preferable, it is within the scope of this invention that any selected position of the nodding mirror 28, designated the nominal position thereof, may be used for design purposes with the resulting introduction of nonlinearities due to the swing of the mirror 28 from its nominal position. After such nominal position is chosen, the resulting nonlinearities of the system must be within the required tolerances for the particular use the designer has in mind. Although the invention will be described with the design position or nominal position substantially centered between the two extreme positions of the mirror 28, it is not essential that such nominal position be chosen there.

Further, the angle of incidence $\beta$ of the collimated light from the lens 30 striking the mirror 28 when the mirror 28 is in its nominal position is ordinarily 45°. An angle different than 45° is shown to demonstrate the generality of the invention.

With the mirror 28 in its nominal positiion, the collimated light from the lens 30 strikes the mirror 28 at an angle of incidence $\beta$. The angle of reflection equals the angle of incidence $\beta$. The axis of rotation 307 of the rotating mirror structure 10 is positioned perpendicular to the reflected collimated light when the mirror 28 is in its nominal position. Since the azimuthal axis of rotation 307 is assumed to be in the vertical, it follows that this perpendicularity to the reflected principal ray 303 is achieved by positioning the nominal or central solid line position of the mirror 28 such that the angle of reflection between the horizontal central ray 303 and the normal to the mirror surface 28 is equal to $\beta$ which is also the angle of incidence of the ray 315 from the fixed source 32 onto the surface of the mirror 28 as shown in FIG. 6. The angles between the mirror surface 28 and the rays 315 and 303 themselves are thus each equal to the compliments of $\beta$, that is, to 90° minus $\beta$. The pencil or bundle of collimated light reflected from the mirror 28 intercepts the mirror surfaces 10a, b, c . . . of the rotating mirror structure 10.

A locus line of centers 301 is defined, intercepting the central or principal ray 303 (which is reflected from the mirror 28 when it is in its nominal position) at a distance $A csc^2\beta$ (which is equal simply to 2A for the usual case when $\beta$ equals 45° since the csc of 45° is equal to two. This distance is measured from the point of incidence N' of such ray 303 upon the mirror 28 to the point of intersection of the locus line 301 with the principal ray 303. The distance A is the distance N'P from the point of incidence on the mirror 28 to the pupil P on mirror 10. This quantity A is an arbitrarily chosen design parameter in terms of which all other quantities may be normalized.

Figure 8:
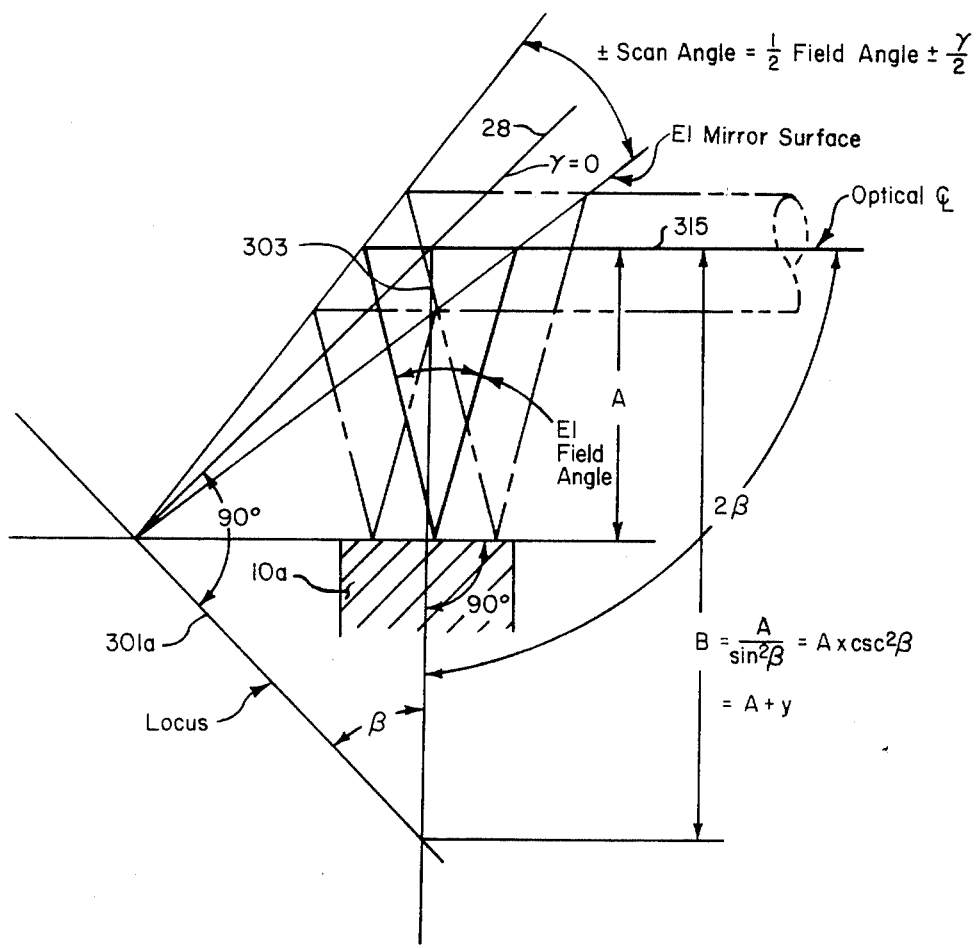
FIGS. 8 and 9 are diagrammatic views illustrating certain geometric and trigonometric relationships derived from FIGS. 6 and 7.
Figure 9:
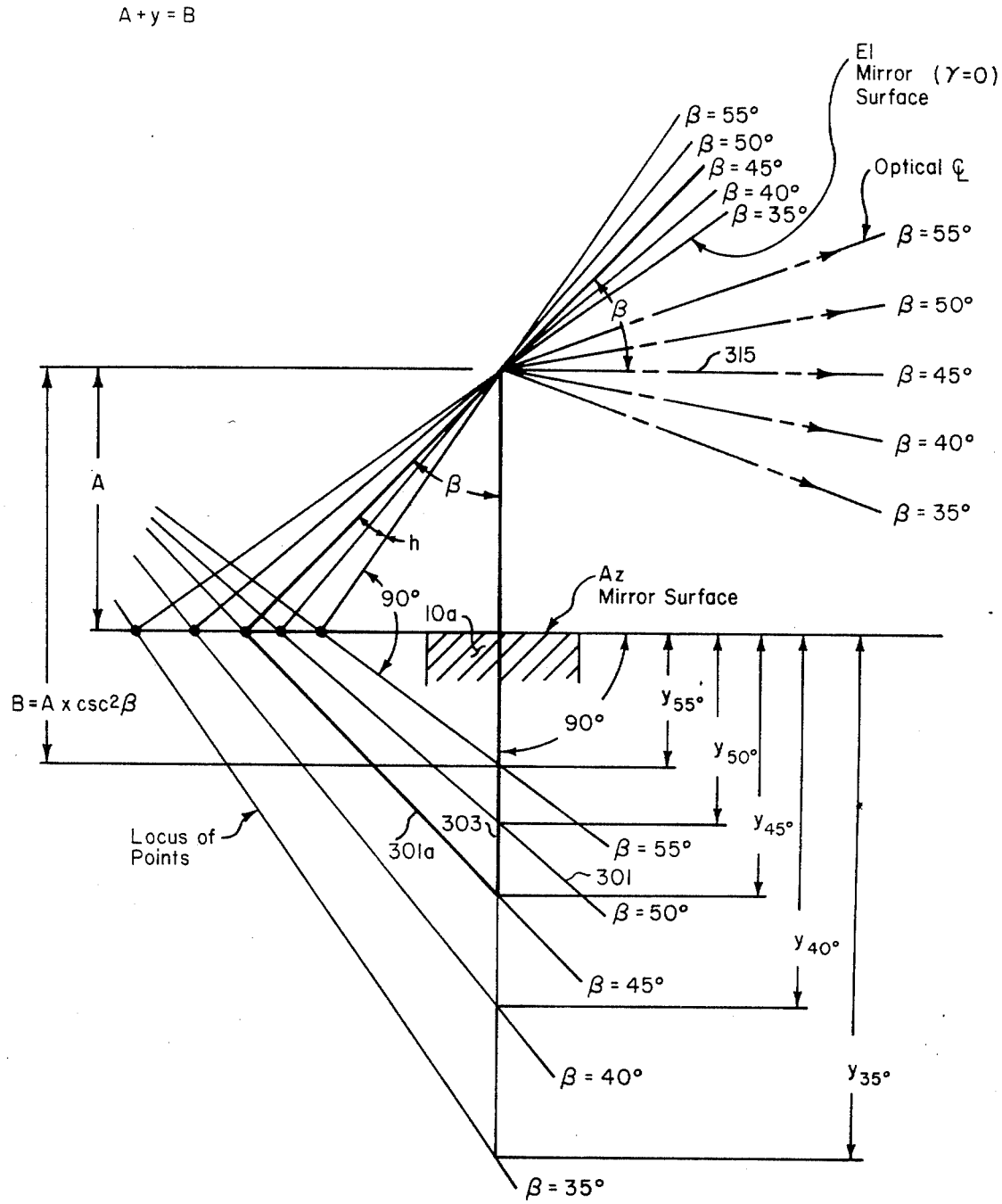

This locus line of centers, one of which may be selected for the center of rotation of the nodding mirror 28, is shown at 301 in FIGS. 6, 8 and 9 for the case of $\beta = 45°$ is indicated at 301a. The chosen value of $\beta$ is also a design parameter. The line of centers 301 is turned from the central or principal ray 303 through the chosen angle $\beta$ in a direction (here shown as upward) which is the same direction as the direction of reflection of the ray 303 turned from the mirror 28. Equivalently, as shown in FIG. 6, this may be stated that where the incident ray 315 is at an angle $\beta$ to the normal, N, to the surface of the mirror 28 which angle is formed by a counterclockwise rotation of the normal N into the incident ray 315, then the reflected principal ray 303 is also rotated counterclockwise through an angle $\beta$ to define the angle of intersection between the principal ray 303 and the locus 301 for the lines of center or axes of rotation of the elevation mirror 28. The center of rotation of the nodding elevation mirror 28 may be chosen at any point, such as points 300, 302, 304, 306 or 308, on the line 301 when the line 301 intersects principal ray 303 at that angle $\beta$ and at the distance $A csc^2\beta$ from the point of reflection N' of the incident ray 315 from the mirror 28 and in any one of these positions the collimated beam from source 32 will be reflected to substantially a single point P' at the center of the pupil P and will stay at that point as the mirror 28 is oscillated from its central solid line position through an elevation field angle $\gamma$ to the two dash line positions shown in FIG. 6. The deviation or wandering of the point P' from a mathematically precise fixed point is also a design parameter of the system which can be maintained within predetermined limits.

The particular point 300 on locus line 361 has an advantage in that it offers the shortest radius of rotation of the mirror 28 and thereby the minimum excursion of the mirror 28 and the minimum moment of inertia to cover the desired field of view. This point 300 is selected on line 301 such that the mirror 28 in its oscillating excursions will physically just clear the rotating mirror wheel 12, will not obstruct the reflected beam, and will position the point N' at which the incident beam 315 is reflected from the mirror 28 in its nominal central position at a distance equal to A from the point P' at the center of the virtual or reflected pupil. The geometry discussed above in FIG. 6 is such as to position the active face 10a of the rotating mirror wheel 10 at this same distance A in order to reflect the virtual pupil P into the rest of the system.

FIGS. 8 and 9 depict the geometric relationship as shown in FIG. 6 from a somewhat different point of view. These views are a representation of geometric relationships in the same plane as the plane of FIG. 6 but rotated by 90°. Thus, the edge of the mirror surface 10a which is shown as vertical in FIG. 6 is shown as horizontal in FIGS. 8 and 9. It will be noted that FIG. 8 is drawn for the case where $\beta = 45°$ which is the most commonly used angle. It shows the optical center line 315 of the beam coming from the source 32 moving from the right of the drawing to be reflected from the surface of the elevation mirror 28 in each of the three positions including its center or nominal design position shown in solid line and the two extremes of its oscillatory travel shown in dashed lines. The beam is then reflected along axis 303 onto the surface of the mirror wheel 10, the oscillation of the mirror 28 having established the elevation field angle. The distance A from the optical center line to the mirror surface is shown more clearly in this view. The locus line is indicated as 301a in FIG. 8 corresponding to locus line 301 in FIG. 6 but differing therefrom by virtue of the fact that FIG. 6 shows the angle $\beta$ as being different from 45° whereas FIG. 8 shows the angle $\beta$ as being equal to 45°. The distance B shown in FIG. 8 as the distance between the ray or axis 315 and the intersection of the locus line 301 with the projection of the axis 303 which thus defines the center of rotation of the mirror 10 may be seen from the geometry of the figure to be equal to the distance A divided by sine$^2$ $\beta$ which, in turn, is equal to $A csc^2\beta$.

The reason for this relationship may be understood more clearly from FIG. 9. In FIG. 9 the 45° value for $\beta$ is shown as the central one of five possible differing values [for $\beta$]. It will be noted that for any value of $\beta$ the intersection of the prolongation of the mirror 28 with the locus 301 of points about which the mirror can oscillate is always a right angle for any one of the nominal design positions. This arises from the fact that as $\beta$ changes the angle between 301 and 303, which is specified as equal to $\beta$, also changes.

In FIG. 9 the distance from the axis 315 for the 45° value of $\beta$ to the uppermost edge of the surface 10a is shown as having the above defined design value "A." The distance from this uppermost edge of 10a to the intersection of the locus line 301a with the axis 303 is indicated by the reference character $\gamma$ with an appropriate subscript indicating the angular value of $\beta$ being considered. For any value of $\beta$ it is in general true that the above mentioned quantity $\beta$ is equal to A + y. From a consideration of the trigonometry of the triangles shown in FIG. 9, however, the following equations will be evident.

$$A + y/\sin 90° = h/\sin \beta \qquad (1)$$

$$h = (A + y) \sin \beta \qquad (2)$$

where $h$, as shown in FIG. 9, is the straight extension of the surface of mirror 28 to the locus line 301a from the point where axis 315 is incident on the mirror 28.

It can also be seen from FIG. 9 that the following equation is true:

$$h/\sin 90° = A/\sin \beta \tag{3}$$

hence $$h = A/\sin \beta \tag{4}$$

But from equations (1) and (3) by combination it follows that $$(A + y) = A/\sin \beta \times 1/\sin \beta \text{ or,} \tag{5}$$

$$(A + y) = A/\sin^2\beta = A\csc^2\beta, \text{ or} \tag{6}$$

$$y = A (\csc^2\beta - 1) \tag{7}$$

The significance of the distance $A\csc^2\beta$ may thus be clearly seen in FIGS. 6 and 9.

Figure 4:
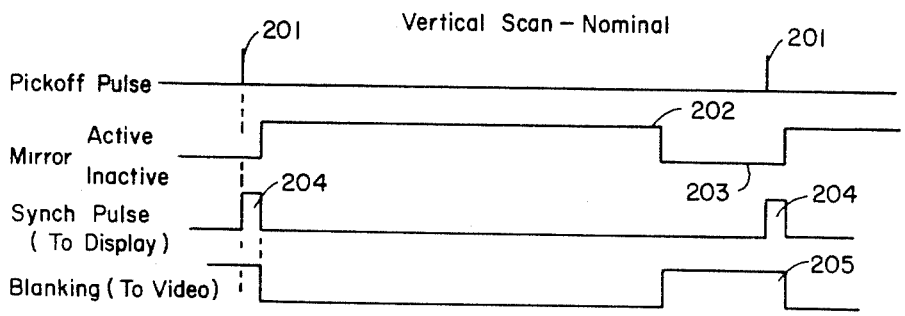
Figure 5:
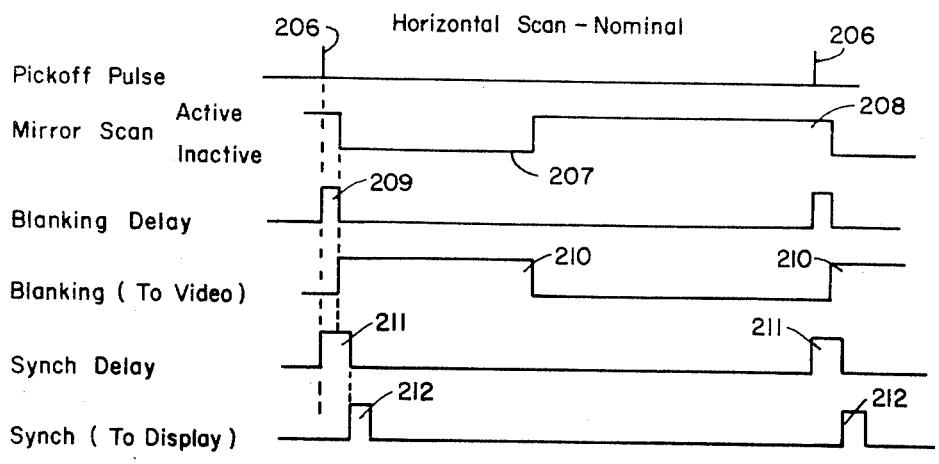
Figure 7:
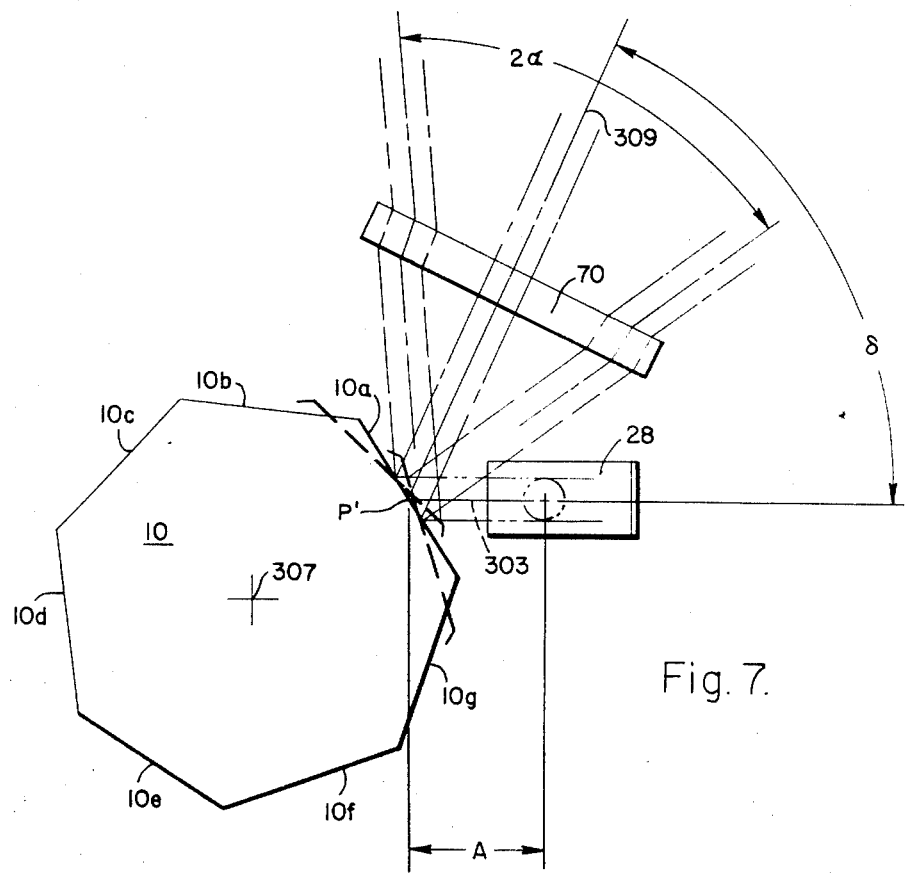

The collimated light reflected from the mirror 28 strikes the mirror surfaces of the rotating structure 10. For example, as shown in FIG. 7, the collimated light, defined by the central ray 303, strikes the mirror surface 10a and is reflected through the window 70. It is convenient to define a nominal angle of incidence $w$ which the central ray 303 makes with the surface 10a when the central ray 303 is reflected substantially into the center of the line of scan as shown at 309 in FIG. 7. The optics are exact at this nominal angle. By choosing the nominal angle wherein the central ray 309 is substantially in the center of the line of scan, non-linearities introduced at the extreme positions shown as angle $\alpha$ on either side thereof are minimized. It is to be stressed, however, that some other angle could be chosen as the nominal design angle, whereby the non-linearities introduced on at least one of the extreme positions of the scan would be greater and the non-linearities in the other extreme position would be smaller than that for the configuration shown. It is, therefore, not essential, although it is preferable, that the nominal angle $\delta$ be measured on a ray at the center of a line scan. The angle $\alpha$ is chosen large enough to produce a desired useful line length to the scan and small enough to avoid interference with the mirror 28. The value of $\alpha$ is determined by the magnitude of the active horizontal scan period as illustrated in FIGS. 4 and 5. This in turn is determined by the timing mechanism.

A conductive pin 20 is positioned upon the cam member 18, and a stationary electrode 22 is positioned adjacent the cam member 18 to produce a synchronizing pulse. When the pin 20 reaches the proximity of the stationary electrode 22, an electrical pulse is generated. The pulse may be generated by the change in electrical capacity between the members 20 and 22 when a voltage is placed between the members 20 and 22. A source for the voltage is not shown.

Similarly, an electrode 42 may be positioned adjacent the rotating mirror structure 10. By making at least the portion of the structure 10 adjacent the mirrors of a conducting material, electrical pulses are delivered to the electronics 60 when the corners of the structure 10 at the intersection of two adjacent mirrors approaches the electrode 42. Details of the electrical system 60 are not shown. It is preferable, but not necessary, that the structure 10 be entirely made of metal.

The invention may be characterized as an apparatus having at least five axes defined thereon including the axes of rotation of both the azimuthal and elevation mirrors as well as the central optical axes defined by the principal or central rays when the elements are in their nominal design positions shown in FIGS. 6 and 7. It will be seen therein that the first axis 315 is the angle of incidence and the second axis 303 is the angle of reflection $\beta$ of the principal ray relative to the mirror 28 when the mirror 28 is in its nominal position. One may specify the relation between the second axis 303 and the first axis 315 as the second axis being turned from the first axis through an angle of $(180 - 2\beta)$ degrees in a counterclockwise direction of rotation about the point N' as a pivot. The third axis 301 is the locus of the possible locations at which the elevational axis of rotation of the mirror 28 perpendicularly intersects the plane of the drawing in FIG. 6 and this locus line 301 is coplanar with the first and second axes 315 and 303. The third axis 301 intercepts the second axis 303 at a distance 2A from the interception of the first and second axes when the angle $\beta$ has its preferred value of 45° and more generally intercepts this second axis at a distance $A \csc^2\beta$ from the intersection point N' of the first and second axes. The third axis 301 is turned from the second axis, through an angle $\beta$, in the same (counterclockwise) sense that the second axis is turned relative to the first axis. The axis of spin 307 of the mirror structure 10 is the fourth axis and is parallel the plane of the first three axes. Usually the axis of spin 307, which has also been referred to as the azimuthal axis of rotation of the mirror structure 10, is offset from the second axis 303. The fifth axis 309 intercepts the second axis 303 at a distance A from the interception of the first two axes 315 and 303. The fifth axis 309, which from FIG. 7 may be seen to intersect the surface 10a at the point P' at the center of pupil P, is in a plane perpendicular to the plane of the first three axes and forms the angle $\delta$ with the second axis 303 when the mirror structure 10 is in its predetermined nominal position.

The usuable portion of the azimuthal sweep of each of the mirror surfaces 10a, b, c, . . . is within an angular region $2\alpha$ about the fifth axis 309. When the structure 10 turns through an angle $\alpha$, the optical sweep is through an angle $2\alpha$. Similarly when the oscillating mirror 28 oscillates through an elevation angle $\gamma$, the optical sweep is through an angle $2\gamma$. The oscillating mirror 28 oscillates about an axis which intercepts the third axis at the point 300 in FIG. 6 and is perpendicular to the plane of the first three axes. Preferably, the axis of rotation of the mirror 28 (shown in FIG. 1 as the longitudinal central axis of shaft 25) is as near as practicable to the mirror 28 so that the moment of inertia of the mirror 28 may be minimized. Location of this elevational axis of rotation of the mirror 28 perpendicular to any point on the third axis or locus 301 is, however, a necessary and sufficient condition in order that the beam having the central axis 315 shall be reflected from any of the oscillatory positions of the mirror 28 through a single virtual pupil P having its center at the point P'.

Further, it is convenient to characterize the mirror structure 10, in its preferred embodiment, as a polygonal cylinder. That is, the sides form a polygon and the surfaces of the sides are parallel to the axis of spin 307. Further, in a preferred embodiment, the polygonal cylinder is a right cylinder wherein the top and bottom surfaces form parallel planes perpendicular to the axis of spin 307.

Collimated light projected onto mirror 28 along the first axis 315 is then swept through an angle 2γ by the oscillation of the mirror 28. Similarly, radiation directed onto the mirror surfaces 10a, b, c, . . . of the structure 10 is swept through an angle at least equal to 2α. The sweeping through the angle 2α produces a line sweep, and the sweeping through the angle 2γ produces a line-to-line indexing of the raster scan.

It is further to be emphasized that the window 70 is not necessarily in all embodiments of the invention. In some embodiments, such as when infrared radiation is scanned, it is important that the interior of the apparatus either be evacuated or have a predetermined atmosphere. Under such circumstances a window 70 is used. When a window 70 is used, particularly when infrared scanning occurs, the window 70 is not necessarily perpendicular to the axis 309, but is preferably tilted thereto through an angle of, for example, on the order of 18° or more, to prevent so-called narcissus effect wherein the reflection of the sensor 32 from the window 70 is in turn sensed by the sensor. By tilting the window 70, reflections of the sensor are no longer sensed.

The invention has been described as a mechanism for projecting collimated light. Alternatively, it may receive and sense collimated light. Assuming that the light is approaching in a field of view shown by the raster of FIG. 1 wherein the sampling areas 34, 36, 38, and 40 are shown in the corners of the field, the apparatus of this invention allows regions of the incoming radiation to be sampled in bundles or pencils such as that shown at 34, 36, 38 and 40, and the field of view is scanned in a raster pattern. The incoming radiation strikes the rotating mirror structure 10 upon the mirror surfaces 10a, b, c, . . . thereof and is reflected onto the nodding mirror 28, thence into the lens 30 from which it is focused, through the stop 31, onto a sensor 32 which delivers a signal of the radiation intensity of the electronics 60. The pulses from the electrodes 22 and 42 are also delivered to the electronics 60 which uses them to produce a pattern on the cathode oscillograph 62 as shown in FIG. 1 indicative of the intensity of the incoming radiation in the region instantaneously scanned. Alternatively, in the devices of FIGS. 12 to 17 these pulses may be used to activate light emitting diode displays which are projected to a display means.

In FIGS. 4 and 5 are wave forms, using the pulses from electrodes 22 and 42 and adapted to control the electronics 60. Typical electronics which are useful with this apparatus are shown and described in the above noted U.S. Pat. No. 3,723,642 entitlted "Thermal Imaging System," filed May 18, 1971, by Peter J. Laakman and assigned to Hughes Aircraft Company, the assignee of this invention. Details of the electronics 60 are not shown, nor are they claimed herein.

Typical pulses generated on the electrode 22 are shown at 201 in FIG. 4. The pick-off pulses 201 are used to generate synchronizing pulses 204 for use by the cathode ray oscillograph display 62. The signals 203 and 205 are disabling pulses which prevent the output of the detector 32 from being displayed on the cathode ray oscillograph 62. The timing of the signals 203 and 205 are such that the cam follower 24 is in the return portion of the cam during the time that the signals 203 and 205 are produced. Thus, during the time of the signals 203 and 205 the elevation mirror 28 is returning to its starting position which is analogous to jumping from the bottom of the raster scan to the top thereof, or alternatively, from the top thereof to the bottom thereof depending upon the direction of the raster scan.

Figure 3:
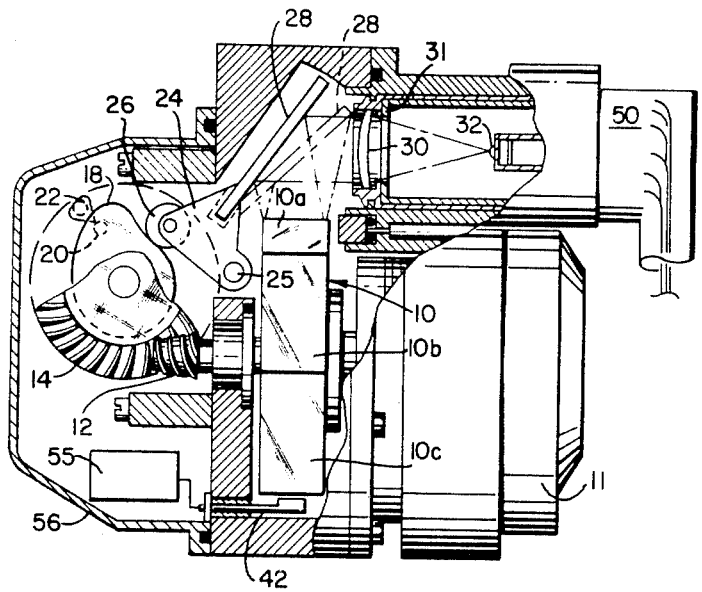

The pulses generated on the pickoff 42 in the embodiment of FIGS. 1 and 3 are shown at 206 in FIG. 5. The pulses 206 produce blanking delays 209. The delays 209 are introduced to allow the electronics sufficient time to commence operating. At the end of the delays 209, a blanking signal 210 is produced which deactivates or blanks the signal from the sensor 32. After a predetermined period of time which allows a particular mirror surface 10a, b, c, . . . to move into position for scanning, the blanking signal 210 is removed and a single line of scan commences. It is desirable that the synchronizing pulse 212 be delivered to the display at the time of fly-back of a line sweep. The fly-back takes a predetermined period of time, whereby the synchronizing pulses 212 is positioned that predetermined time prior to the removal of the blanking signal 210. The synchronizer pulse delay signal 211 is adjusted to cause the synchronizing pulse 212 to appear at the proper time.

Figure 2:
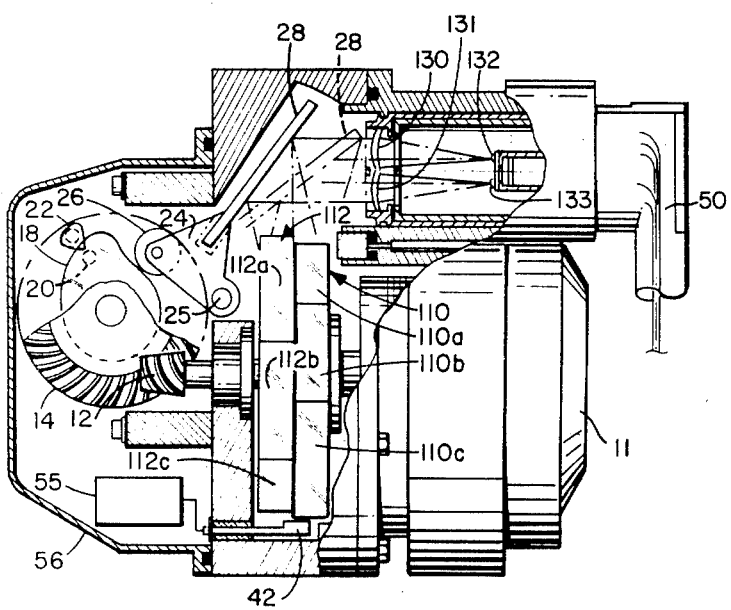

An alternative embodiment of the rotating mirror structure 10 is shown at 110 in FIG. 2. The rotatable mirror structure 110 has two sets of mirror surfaces, each substantially identical with that shown at 10a, b, c, . . . of FIG. 1. A first set of mirror surfaces 110a, b, c, . . . and a second set of mirror surfaces 112a, b, c, . . . are shown side-by-side in FIG. 2, and they rotate together. The sets of mirror surfaces are angularly positioned relative to each other, preferably through a one-half mirror length. That is, for example, the intersection between surfaces 112a and 112b is angularly positioned to align with substantially the middle of the mirror surface 110b. Each of the sets of mirrors 110a, b, c, . . . and 112a, b, c, . . . has associated therewith a separate sensor and lens system. For example, the mirror surfaces 110a, b, c, . . . direct incoming light off of the mirror 28 into lens 130 and thence onto the detector 132. The mirror surfaces 112 a, b, c, . . . direct light off of mirror 28 into the lens 131 and onto the detector 133. In the embodiment of FIG. 2, the electronics is adjusted such that when detector 132 is blanked, detector 133 is operating, and when detector 133 is blanked, detector 132 operates. In other respects the structure of FIG. 2 is substantially identical with that of FIG. 1. It should be noted, however, because of the staggered relation of the two sets of mirrors 110a, b, c, . . . and 112a, b, c, . . . the pickoff 42 produces twice as many synchronizing signals, and the synchronizing signals can be used to control, for example, a flip-flop circuit which is used to control blanking of the sensors 132 and 133. The geometrical relationship between the sensors 132, 133, the lenses 130, 131, the elevation mirror 28, and the sets of mirrors 110a, b, c, . . . and 112a, b, c, . . . are substantially identical with that described in connection with the single set of mirror structure.

In a typical apparatus wherein the number of mirror surfaces on a mirror structure such as that of FIG. 1 is seven, or wherein there are two sets of seven mirrors as shown in the apparatus of FIG. 2, a typical speed for the motor 11 is 67,500 r.p.m. A typical value for the angle $\delta$ is 65°, for $\alpha$ is 21.6°, for $\beta$ is 45°, and for $\gamma$ is 16.2°. With a motor speed of 67,500 r.p.m. and seven mirror surfaces on the structure 10, one achieves an azimuth scan efficiency of 42 percent, producing 525 azimuth scans per frame with 60 elevation scans per second and elevation scan efficiency of 85, a frame rate of 15 frames per second, a field coverage of 32.4° by 43.2°, and an interlace of four.

In the timing diagram of FIG. 4, the time between pickoff pulses 201 is typically 16.667 milliseconds. The time delay between the receipt of the pickoff pulse and the end of the blanking pulse is 205 microseconds. The duration of activity of the mirror is 14.167 milliseconds. The length of the blanking pulse 203 is 2,500 milli-seconds. The length of the synchronizing pulse 204 is 210 microseconds.

In the diagram of FIG. 5, the time between the pickoff pulses 206 is 126.98 microseconds. The length of blanking delay is 2.47 microseconds. The length of the blanking 207 is 73.65 microseconds. The time of duration of active mirror scan 208 is 53.33 microseconds. The length of sync delay 211 is 4.47 microseconds. The length of the synchronizing pulse 212 is 2 microseconds. This timing is achieved by using a ratio of azimuth to elevation speed reducer of 18.75 to 1.

The single mode apparatus of my copending application Ser. No. 152,466, therefore, scans the pupil of the lens 30 and stop 31 to produce a raster scan of collimated radiation all of which appears to originate in both the azimuth and elevation scan from the single virtual pupil P which is the reflection of the pupil of the lens 30 reflected from mirror 28 and which, in turn, is reflected by the mirror wheel 10 due to the fact that the azimuthal axis of rotation of that wheel 10 is positioned so as to locate the faces of the mirror wheel at the location of the virtual pupil P. Alternatively, the apparatus scans a field of collimated light in a raster pattern and delivers radiation from the scanned portion to a sensor 32 in the reverse of this relationship and thereby produces a scan image of the field which is free from both image rotation and astigmatic distortion by virtue of the location of the pupil P and which may, therefore, be derived through a suitable spherical magnifying objective lens having its optical axis positioned along the axis 309.

Figure 10:
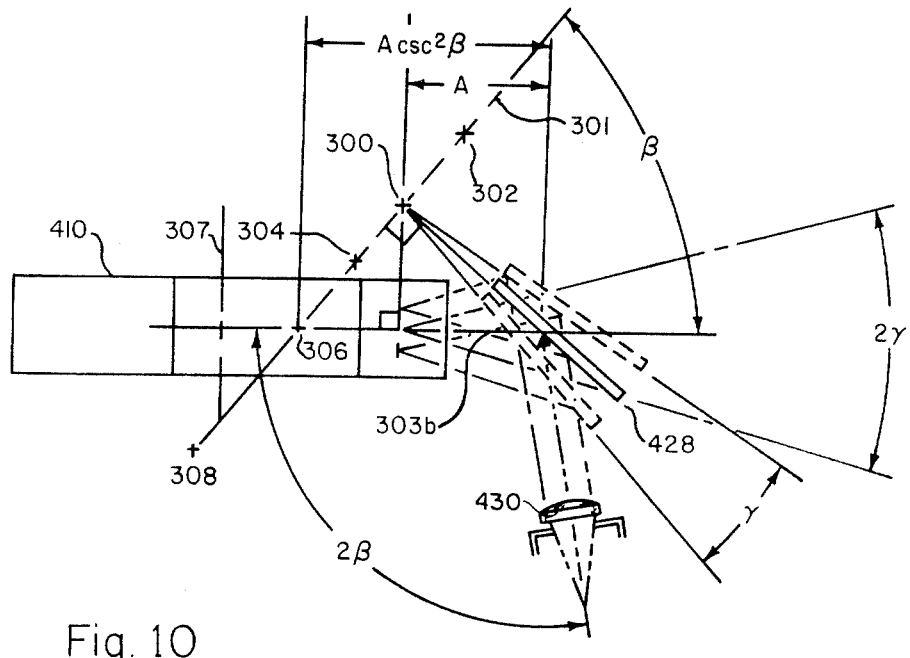
FIGS. 10 and 11 are diagramatic views similar to FIGS. 6 and 7 but illustrating the dual mode apparatus of the present invention.
Figure 11:
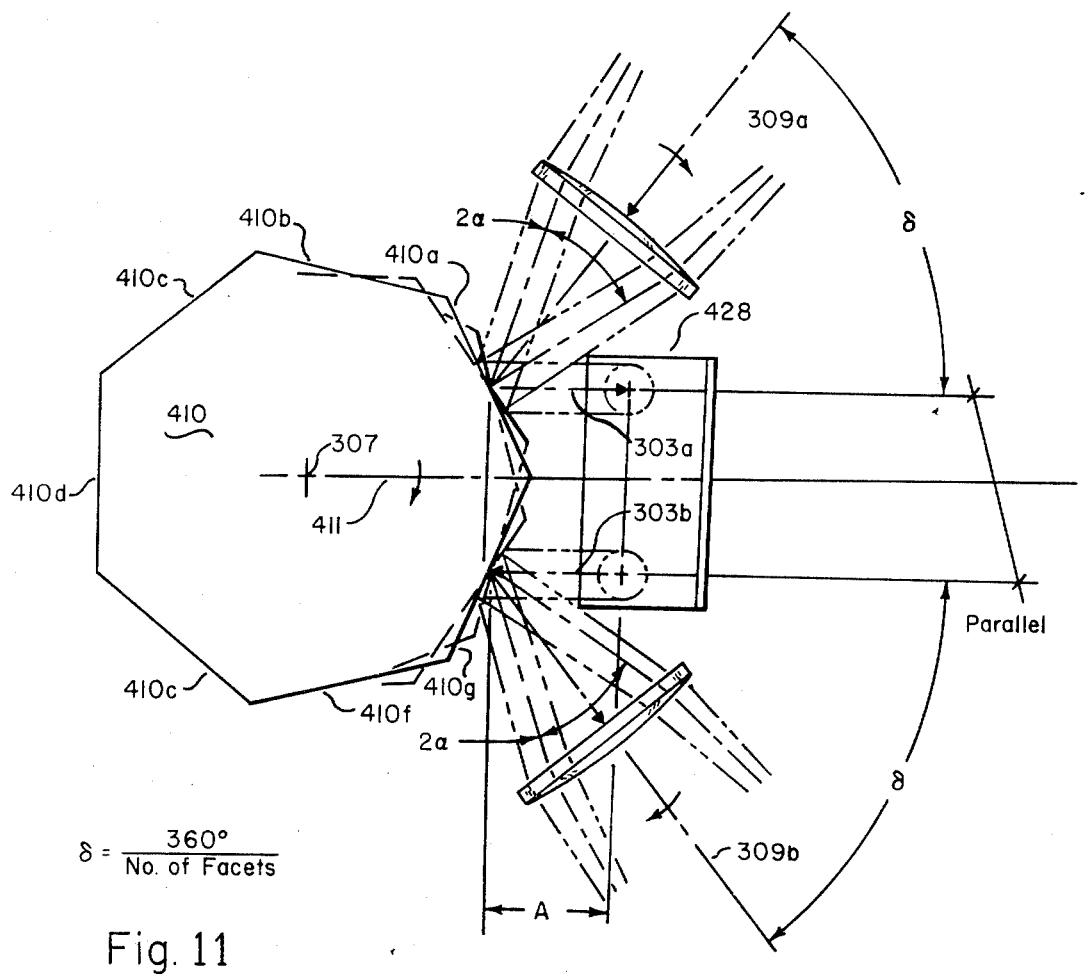

As may be seen more particularly in FIG. 11, the fact that the optical path may be traced in either direction so that the single mode apparatus can be thought of as either a receiver or a projector permits one, with additional limitations to be specified, to modify the apparatus so that it may be used to simultaneously perform the functions of both receiving and displaying. In such a modification the optical path for receiving is preferably positioned to utilize a face on the rotating mirror wheel 10 which is immediately adjacent to or minimally separated from the face which is used for projection or display. In this fashion the mirror 28 can be a single mechanical structure which has different portions of its mirror face used in the two paths so as to achieve complete synchronization. The device of FIGS. 10 and 11 thus consists of an optical scanning device which detects infrared energy from a scene, converts the received signals in the visible light output, and displays the scene to an observer to the same scanning device. FIGS. 10 and 11 show the optical geometry for this dual mode system in its generalized form. The figures are an extension of the single mode geometry illustrated in FIG. 6 and 7. Where the same or corresponding parts are involved similar reference characters are used. The suffixes $a$ and $b$ are applied in order to illustrate the features of the invention which become dual mode. For example, in FIG. 11 the axes 303a and 303b are indicated rather than a single axis 303 as shown in FIG. 7.

The receive and display optical paths are angularly separated in the azimuth plane by an angle $2\delta$, where $\delta$ equals 360° divided by the number of facets on the mirror wheel 10 if immediately adjacent faces are used so that the elevation displacement can be achieved by a common mirror 28 rotating about a common pivot located on the locus line 201. The scanner can view a scene having an angular width of $2\alpha$ by $2\gamma$ directly, although many applications require magnification or demagnification of this basic field. The common point of rotation of angles $2\alpha$ and $2\gamma$ is specifically for compatibility with afocal and gallalian optical systems.

More generally there should be an angle equal to $2(n + 1)\delta$ between the receive and display light paths where $\delta = 360°/$ number of faces on the mirror drum and where $n$ equals the number of faces between the faces used in the two paths. Thus, where adjacent faces are used $n = 0$ and the angle between paths $= 2\delta$. Where faces separated by one inactive face are used, $n = 1$ and the angle $= 4\delta$; where 2 faces intervene, $n = 2$ and angle between paths $= 6\delta$; etc.

Figure 17:
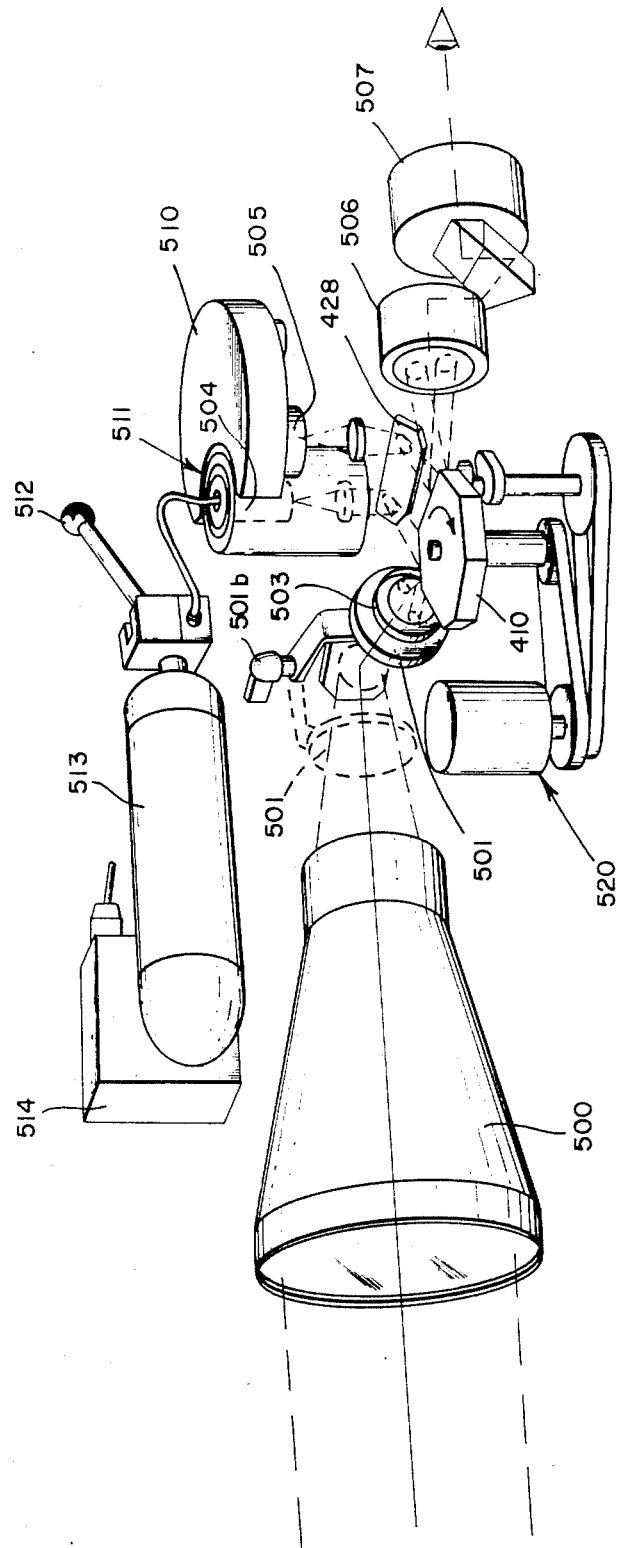
FIG. 17 is a detailed assembly view of the apparatus diagrammatically illustrated in FIG. 12.

FIG. 12 and 12a are two versions of a typical afocal infrared optical system switchable between two fields of view normally used where large magnifications are required. A diagrammatic assembly view of the optical system of FIGS. 12 and 12a is shown in FIG. 17. FIG. 13 is an optical schematic of a periscopic narrow field of view system embodying the dual mode apparatus of this invention. FIG. 14 is an optical schematic of a remote narrow field of view system using a vidicon in conjunction with the optics of FIGS. 10 and 11. FIG. 15 is a schematic of optical apparatus suitable for incorporation into a single field hand-held device utilizing gallilean optics. FIG. 16 is an optical schematic of apparatus similar to that shown in FIG. 14 but incorporating a remotely viewable wide field of view telescopic system. In each of these embodiments the mechanism creating the elevation scan produces an approximate point of rotation which is located coincident to the azimuth center of scan in order to preserve the advantages of absence of image rotation and the astigmatism which have been discussed above in connection with the single mode system.

Turning again to FIGS. 10 and 11, it will be noted that FIG. 10 corresponds generally to FIG. 6 and FIG. 11 corresponds generally to FIG. 7. FIGS. 10 and 11, of course, show the dual mode embodiment rather than the single mode embodiment shown in FIG. 6 and 7. Where corresponding structural members are involved in the two embodiments, the reference characters have been increased by 400 in FIGS. 10 and 11. Thus, the faceted mirror wheel 410 of FIG. 10 which produces the azimuth scan $2\alpha$ corresponds with the mirror wheel 10 of FIG. 6 whereas the elevation mirror 428 of FIGS. 10 and 11 corresponds to the elevation mirror 28 of FIGS. 6 and 7. The reference characters indicating the optical or geometric axes of the system have been left unchanged in the two embodiments where in fact they denote the same concept. Where, as in FIG. 11, the dual mode system involved two axes of the type where one is shown in FIG. 7, the duality relationship is indicated by the suffixes a and b. Thus, the axis 303a is in the receiving mode optical path whereas the axis 303b is in the optical path for the display mode. Similar comments apply to the axes 309a and 309b. The arrowheads on the optical center lines indicate the direction of energy transmission.

It will be noted from FIG. 11 that the mirror 428 has a length at least equal to the length of one facet of the mirror wheel 10 so that the two optical paths may be accommodated by the single mirror and be positioned at substantially the mid-point of adjacent faces on the mirror 10. It will also be noted that the optical paths 303a and 303b along which the beams in the two modes to be synchronized travel in one direction or the other between the elevation mirror 428 and the azimuth mirror 410 are parallel to each other and to the extension of a radius such as 411 of the rotating drum 410. The optical paths 309a and 309b along which radiation is shown to be respectively incident on and reflected from the drum 10 in the two synchronous modes respectively made angles δ extending in opposite direction from the parallel axes 303a and 303b so that the axes 309a and 309b are separated by an angle of 2δ. As noted above, the magnitude of δ is equal to 360° divided by the number of faces on the mirror wheel 10.

In FIGS. 12 and 12a the inclusion of such a dual mode synchronous scan in exemplary devices is illustrated in optical schematics. In these exemplary systems a two component objective lens system 500 receives infrared radiation and transmits it through a field switching lens 501. The field switching lens 501 is shown in solid line in one of its two positions and in dashed line in the other of its two positions, the lens being mounted on a pivotal support as may more clearly be seen in FIG. 17. In one position of the lens 501, the telescope has a narrow field of view whereas in the other position it has a wide field of view. In either position the received radiation is next transmitted to an infrared relay lens 503 and thence onto the rotating azimuth scan mirror drum 410. In FIG. 12 folding mirror 502 is between lens 503 and drum 410. In FIG. 12a, mirror 502 is diminished by use of the modified prism arrangement shown at 520. From the mirror drum 410 radiation is reflected to the elevation scan mirror 428 and from there it is focused onto a detector array 504 as seen in FIG. 17. The detector array generates electrical signals which are used to activate a light emitting diode array 505 which in turn is the source of the display mode optical path or, considered alternatively, the projection mode path. From the light emitting diode array 505 radiation is transmitted back to the other path for portion of the elevation mirror 428 from which it is reflected onto the next or immediately adjacent surface of the mirror drum 410. From there it is transmitted through a visual or display relay lens 506 through any suitable optical system or eyepiece 507 for observation by an observer.

In FIG. 17 it will be noted that the two element infrared objective lens 500 is followed by the pivoted field switching lens 501 which is mounted on a pivot mechanism 501P. This is followed by the infrared lens 503 which transmits radiation onto the azimuth scan wheel 410 and thence to the elevation scan mirror 428. The detector array 504 and the light emitting diode array 505 are associated with a preamplifier-driver assembly 510. A cryostat 511 is provided for cooling gas. A power supply battery 514 if provided for the electrical energization of the system. The drive motor 520 is connected in any convenient manner to drive the azimuth and elevation scan wheels.

In FIG. 13 there is shown a periscopic system including the field switching lens 501, the two element objective 500 and a folding mirror 600 which is pivotally mounted on an axle 601 so that the vertically extending optical path through the objective 500 may be folded to any desired generally horizontal angle.

In FIG. 14 the dual mode optical scan generator is included in a system adapted for remote viewing by virtue of the inclusion in the system described above of a vidicon display tube 700 in place of the eyepiece assembly 507 which in FIG. 12 also includes an inverting prism 525. The vidicon tube 700 forms a TV scanned image of the display output of the system which may be transmitted in standard fashion to a remote viewing location.

In FIG. 15 there is shown a device embodyin the scan generating wheel 410 and mirror embodying which is configured to be included in a single field of view and hand-held device using Gallilean optics. Thus, the field switching lens 501 is not an essential element of the system and is omitted from this embodiment. The two element objective lens system 500 directly supplies radiation to the mirror 410. The display is projected through a relay lens 506 to a folding mirror 530 to the eyepiece 507.

In FIG. 16 there is shown a single field of view device wherein a wide field of view receiving system is combined with a vidicon output for remote monitoring. Such a system is useful in many surveillance applications. The objective lens system 500 transmits radiation directly to the azimuth wheel 410 and thence to the elevation mirror 428. The vidicon 700 receives the display through relay lens 506 and the output from the vidicon is transmitted as a television signal for remote monitoring. It is thus seen that the dual mode optical raster scan generator is suitable for use in many different system configurations by virtue of the fact that it can accommodate itself to use with any afocal magnifying system for receiving and/or displaying an image.

What is claimed is:

1. Apparatus for simultaneously producing nonastigmatic synchronized receive and display mode raster scans for infrared detector upconversion devices suitable for use with an afocal magnifying system, said apparatus being characterized by:

a. a frame;
   b. a rotatable azimuth scan generating mirror structure mounted for rotation about a spin axis relative to said frame and having a plurality of radially directed axes defined on and rotating with said structure, each of said radial axes being perpendicular to said spin axis, said axes being substantially uniformly spaced angularly about said spin axis, a plurality of mirror surfaces on said mirror structure, each said mirror surface being perpendicular to a different one of said radial axes;
   c. elevation scan generating mirror means mounted for oscillation relative to said frame about an oscillation axis which is parallel to a plane which in turn is perpendicular to and displaced from said spin axis;

d. said oscillating mirror means being positioned in each of two light paths each of which periodically includes each of said rotating mirror surfaces, said oscillation axis orthogonally passing through a point on a locus of oscillation centers, said locus lying in the plane of the central rays respectively incident on and reflected from said oscillating mirror and making an angle $\beta$ with said reflected ray which is equal to the angle of incidence of said central ray on said oscillating mirror when said mirror is in its nominal central position so that the orthogonally directed scans produced by said rotatable mirror and said oscillating mirror both appear to originate from substantially the same spot on a surface of said rotatable mirror; and e. one of said light paths receiving radiation from a scanned scene and transmitting it to an infrared detector, the other of said light paths transmitting radiation from a local source to a display means, said transmitted radiation being intensity modulated responsively to the output of said detector in order to produce a visible image of said scene, said scans being synchronized by the inclusion of said oscillating mirror in each of said light paths.

2. Apparatus as in claim 1 wherein at least one of said light paths includes an afocal magnifying optical element.

3. Apparatus as in claim 1 wherein:

a. each of said two light paths at any given instant includes a different one of the mirror surfaces of said rotatable mirror structure for generating the azimuth scan of said receive and display modes respectively and also includes a different portion of mirror surface of said oscillating mirror means for generating the elevation component of scan of said receiving and display modes respectively.

4. Apparatus as in claim 3 wherein said different surfaces of said rotatable mirror structure are immediately adjacent surfaces on said structure and wherein one of said paths has the incident ray on one of said surfaces parallel to the reflected ray from the adjacent surface of said rotatable structure in the other of said paths and wherein the incident and reflected rays in each of said paths make an angle $\delta$ with each other in their common plane which is equal to 360° divided by the number of mirror surfaces on said rotatable mirror structure, said angles extending in opposite direction in said plane from said parallel rays.

5. Apparatus as in claim 4 wherein said oscillating mirror has a length extending perpendicularly to its axis of oscillation which is greater than the length of a single mirror surface on said rotatable mirror structure in order to accommodate both of said light paths including adjacent surfaces on said rotatable mirror on a single surface of said oscillating mirror.

6. Apparatus as in claim 1 and further characterized by:

a. said frame having at least five directional axes defined with respect thereto for each of two light paths; means coacting with said oscillating mirror to define, when said oscillating mirror is at a preselected central nominal design position in its wing, the first of said optical axes extending in the direction of transmission of radiation between said coacting means and said oscillating mirror; said second optical axis extending in the direction of transmission of radiation between said oscillating mirror and said rotatable mirror structure, the angle $\beta$ between the normal to said oscillating mirror surface and said first axis being equal to the angle between said normal and said second axis; said second optical axis being positioned when said oscillating mirror surface is in a central design position in a plane which is substantially perpendicular to the surface of said rotatable mirror structure, said second axis intercepting said first axis on the surface of said oscillating mirror and being turned from said first axis through an angle equal to $(180 - 2\beta)°$; a third axis intercepting said second axis at a distance $A \csc^2\beta$ from the interception of said first and second axes and turned from said axes through an angle $\beta$, said first, second, and third axis being coplanar, said third axis comprising a locus line of the centers of oscillation of said oscillating mirror; a fourth axis perpendicular to said second axis and parallel to the plane of said first three axes, said fourth axis comprising the spin axis of said rotatable mirror structure; and a fifth axis intercepting said second axis at a distance A from said interception of said first and second axes, said second and fifth axes defining a plane perpendicular to the plane of said first three axes and said fifth axis being turned from said second axis through an angle $\delta$;

a rotatable mirror structure rotatable about said fourth axis and including a plurality of radial directions defined thereon perpendicular to said fourth axis, said structure having a plurality of mirror surfaces thereon, each of said surfaces being perpendicular to a different one of said radial directions, said mirror surfaces being positioned to intercept said second axis consecutively when said structure is rotated;

an oscillating mirror structure having limited oscillation about an axis centered on and perpendicular to said third axis and parallel to the plane of said second and fifth axes, said oscillating mirror structure having mirror surface means thereon intercepting said first and second axes;

each of said light paths including said oscillating mirror structure and having said five axes associated with it, the first and second axes in each of said paths being separate from and parallel to each other; said third locus line axis and said fourth rotatable mirror spin axis being the same for each of said paths; said fifth axis in each of said light paths making an angle $\delta$ with said second axis in the same light path, said fifth axes in said two light paths being coplanar with each other and making an angle $2\delta$ with each other where said angle $\delta$ has a value equal to 360° divided by the number of surfaces of said rotatable mirror structure.

7. Apparatus as in claim 6 in which rotation of said mirror structure produces an optical sweep about said fifth axis in each of said light paths through a usable angle $2\alpha$, whereby radiation delivered in a bundle substantially along said second axis to said mirror surfaces of said rotatable mirror structure is projected and sweeps through at least an angle $2\alpha$ from said fifth axis about an axis parallel to said fourth axis and radiation delivered, at least within an angular region $2\alpha$ of said fifth axis, to said mirror surfaces of said rotatable mirror structure is scanned and delivered along said second axis to said oscillating mirror structure.

8. Apparatus as in claim 6 wherein the oscillation of said oscillating mirror structure is through an angle $\gamma$ whereby radiation delivered substantially along said first axis in either of said light paths to said oscillating mirror is projected and swept at least through an angle $2\gamma$, and radiation received through at least an angle $2\gamma$ about an axis passing through the intersection of said second and fifth axes and perpendicular to the planes of said first and second axes at least through an angle $2\gamma$ is delivered and projected substantially along said first axis.

9. Apparatus as in claim 7 and further comprising means in one of said light paths for producing a pencil of beams of light substantially along said first axis and means in the other of said light paths for detecting a pencil of infrared radiation transmitted substantially along said first axis therein.

* * * * *